US005711878A

United States Patent [19]

Ogata et al.

[11] Patent Number: 5,711,878
[45] Date of Patent: Jan. 27, 1998

[54] CYLINDRICAL FILTER

[75] Inventors: Satoshi Ogata; Shinichi Tokudome, both of Moriyama, Japan

[73] Assignee: Chisso Corporation, Osaka-Fu, Japan

[21] Appl. No.: 740,427

[22] Filed: Oct. 29, 1996

[30] Foreign Application Priority Data

Nov. 2, 1995 [JP] Japan .................................. 7-285986

[51] Int. Cl.$^6$ ..................................... B01D 27/14
[52] U.S. Cl. ................ 210/490; 210/493.1; 210/497.01; 210/504; 210/505; 210/508; 428/131; 428/171; 156/218
[58] Field of Search ............................ 210/497.01, 493.1, 210/490, 504, 505, 508; 428/131, 171, 288; 264/234; 156/73.2, 218

[56] References Cited

U.S. PATENT DOCUMENTS

| 4,100,009 | 7/1978 | Nakajima et al. ..................... 156/184 |
| 4,221,226 | 9/1980 | Keifer et al. . | |
| 5,503,745 | 4/1996 | Ogata et al. ............................. 264/234 |
| 5,543,047 | 8/1996 | Stoyell et al. ....................... 210/493.2 |

FOREIGN PATENT DOCUMENTS 56-49605  11/1981  Japan .

*Primary Examiner*—W. L. Walker
*Attorney, Agent, or Firm*—Fay, Sharpe, Beall, Fagan, Minnich & McKee

[57] ABSTRACT

A cylindrical filter is disclosed which comprises a wound up layer of a fibrous aggregate comprising melt-adhesive composite fibers bonded each other through the melt of a melt-adhesive component in the composite fibers and a layer of non-woven fabric of glass fibers, the layer of non-woven fabric is arranged on the outer surface of the wound up layer of the fibrous aggregate, and glass fibers have a smaller diameter than that of the melt-adhesive composite fibers. The cylindrical filter has an excellent filter rating and filter life.

7 Claims, No Drawings

CYLINDRICAL FILTER

BACKGROUND OF THE INVENTION

1. Field of the Invention

The present invention relates to a cylindrical filter. More specifically, the present invention relates to a cylindrical filter (so-called a cartridge filter) for precision filtration which is improved both in filter rating and filter life.

2. Description of the Related Art

Heretofore, cartridge filters are known as filter for precision filtration which are produced by first heating a layer of a fibrous aggregate comprising melt-adhesive composite fibers and having a certain width to melt-adhering temperature in advance, winding up the heated layer of a fibrous aggregate on a winding core to form an inner, supporting layer, then winding up a sheet, for example, a filter paper, spun bond paper, membrane filter having the same width as that of the inner layer of a fibrous aggregate and having pores of a desired size, on the surface of the wound up supporting layer to form a layer of precision filtration, winding up the layer of a fibrous aggregate mentioned above on the surface of the layer of precision filtration to form a pre-filtration layer, cooling them, and finally drawing out the winding core (Japanese Patent Publication No. Sho 56-49605).

Whereas the filter rating of the filters produced by such a method can be controlled by selecting a sheet to be arranged between the layers of a fibrous aggregate, any of such filters are not necessarily satisfied with their filter life.

SUMMARY OF THE INVENTION

An object of the present invention is to solve the problem mentioned above and to provide a cylindrical filter which have an excellent filter rating and is excellent in filter life.

As a result of the investigation, it has now been found that the object of the present invention can be achieved by providing a cylindrical filter comprising a wound up layer of a fibrous aggregate comprising melt-adhesive (heat melt-adhesive) composite fibers bonded to each other through the melt of a melt-adhesive component in the composite fibers and a layer of a non-woven fabric of glass fibers, the layer of the non-woven fabric is arranged on the outer surface of the wound up layer of the fibrous aggregate, and the glass fibers have a smaller diameter than that of the melt-adhesive composite fibers.

Alternatively, the object of the present invention can be achieved by providing a cylindrical filter comprising a wound up innermost layer, outermost layer, each of the layers is comprised of a fibrous aggregate of melt-adhesive composite fibers bonded to each other through the melt of a melt-adhesive component in the composite fibers, and a layer of a non-woven fabric of glass fibers, the layer of the non-woven fabric is arranged between the innermost layer and outermost layer, and the glass fibers have a smaller diameter than that of the melt-adhesive composite fibers.

DESCRIPTION OF THE PREFERRED EMBODIMENTS

In the cylindrical filter of the present invention, it is preferable that the layer of a non-woven fabric of glass fibers is circumferentially arranged at the position of ⅓ to ⅘, more desirably ½ to ⅘ in thickness direction of the cylindrical filter from inner surface of the filter, has a porosity of 96% or greater, and occupies 10 to 50% of the thickness of the cylindrical filter.

Composite fibers used in the cylindrical filter of the present invention are preferably composed of a low melting point component and a high melting point component, and both of the components have a difference in their melting point of 10° C. or more. Also, in the present cylindrical filter, the glass fibers which form a layer of a non-woven fabric preferably have a diameter of 3 μm or smaller.

The cylindrical filter of the present invention is usually produced by heating a fibrous aggregate comprising melt-adhesive composite fibers and having a certain width to a melt-adhering temperature in advance, winding up the heated fibrous aggregate on a winding core to form an inner or innermost layer of the cylindrical filter, then winding up a non-woven fabric of glass fibers having the same width as that of the wound up inner or innermost layer of a fibrous aggregate and having a porosity of 96% or greater on the inner or innermost layer up to a predetermined thickness to form a layer of a non-woven fabric of glass fibers, cooling them, and finally drawing out the winding core.

In a preferable embodiment of the present invention, another fibrous aggregate comprising the same melt-adhesive composite fibers as mentioned above is wound up on the layer of the non-woven fabric to form an outermost layer.

According to the present invention, filter rating of cylindrical filters can be increased and filter life of the cylindrical filters can be considerably prolonged by decreasing the bulkiness and elasticity of a layer (web) of the fibrous aggregate heated to a melt-adhering temperature, to a proper value, and forming melt-adhered points between fibers when the layer (web) is wound up on a winding core; and winding up a non-woven fabric of glass fibers on the outer surface of the layer (web) of the fibrous aggregate.

Reasons why both of the filter rating and filter life are improved are not necessarily clear. However, it is considered as their reasons that the structure of cylindrical filters at a medium portion composed of a non-woven fabric of glass fibers is not flattened since the layer of a non-woven fabric of glass fibers itself has a strong resistance against deformation (pressure with water at the time of filtration); that an appropriate degree of a buffer layer against the water pressure at the time of filtration is formed since the layer of a fibrous aggregate of melt-adhesive composite fibers and the layer of a non-woven fabric of glass fibers are not adhered; accordingly that the size (or diameter) of pores in the filter containing a layer of a fibrous aggregate comprising melt-adhesive composite fibers arranged at an inner position of the layer of a non-woven fabric of glass fibers are secured; and thus that filter rating is stabilized and a precision filtration is actualized based on the fineness of diameter of glass fibers themselves.

While compression is progressed as the capturing of contaminants is increased in conventional filters comprising only melt-adhesive composite fibers, such compression hardly occurs in the filters of the present invention in which a non-woven fabric of glass fibers is used on the outer surface of a layer of a fibrous aggregate. This is considered to be due to the fact that the filter of the present invention has a large elastic recovery, leading to a prolonged filter life.

A layer of a fibrous aggregate comprising melt-adhesive composite fibers is generally used in the form of a web, and the web is heated to a melt-adhering temperature usually when it passes through a heating zone or heating unit, with being placed on a conveyer. As the heating source, while infrared heaters are preferably used, moderately heated air may also be used.

Non-woven fabric which is arranged on the outer surface of a layer of a fibrous aggregate of melt-adhesive composite fibers is comprised of glass fibers having a smaller diameter than that of the melt-adhesive composite fibers. By using such glass fibers as having a small diameter, filter rating can be increased. Also, filter life of the cylindrical filters as a whole can be increased since the non-woven fabric of glass fibers has a high porosity due to the rigidity of glass fibers.

Non-woven fabric of glass fibers preferably has a porosity of 96% or higher, more desirably 98 to 99%. Whereas the thickness of the non-woven fabric of glass fibers when arranged in cylindrical filters is preferably as thin as possible in order that the non-woven fabric is wound up on the outer surface of an inner layer of a fibrous aggregate, or wound up between an innermost layer and outermost layer of the fibrous aggregate in the shape of a sandwich, and firmly fixed. However, the thickness of the non-woven fabric of glass fibers is preferably 10 to 50% and more desirably 20 to 40% based on the total thickness of cylindrical filter from actual point of view.

When the resistance of cylindrical filter against pressure is taken into consideration, the position where a non-woven fabric of glass fibers is arranged is preferably ⅓ to ⅘ and more desirably ½ to ⅘ of the thickness of cylindrical filter from its inner surface.

Type of glass fibers is not specifically restricted, and it can suitably be selected from the aspect of a minimum diameter of particles to be captured with the cylindrical filter and chemical resistance to the liquid to be filtered. When the thickness of glass fiber web is too small, filter rating is not so much improved, and a sufficient filter life can not be achieved since the capturing layer becomes too small.

As the position where a non-woven fabric of glass fibers is arranged or wound up becomes smaller than ⅓, particularly ½ from the inner surface of a cylindrical filter, the resistance of a layer of a fibrous aggregate of melt-adhesive composite fibers, which supports a layer of a non-woven fabric of glass fibers, against pressure decreases and the layer of fibrous aggregate becomes easy to deform.

Conversely, when a non-woven fabric of glass fibers is arranged at the position over ⅘ of the thickness of the cylindrical filter from its inner surface, it becomes impossible to fix a layer of a non-woven fabric of glass fibers in a stable condition. Further, filter life becomes short since a cylindrical filter does not have a sufficient thickness of the layer for capturing larger particles.

Forming a layer of a non-woven fabric of glass fibers is satisfactorily conducted by winding up the non-woven fabric upon the outer surface of a web of a fibrous aggregate of melt-adhesive composite fibers as disclosed in Japanese Patent Publication No. Sho 56-49605.

The cylindrical filter of the present invention may be circular cylindrical filters having a right circular or oval cross-section, or angular cylindrical filters having a multi-angular cross-section such as triangular, tetra-angular, or more. When a winding core has a polygonal shape (for example, hexagon or octagon), the appearance of the filter at the corner of a polygon becomes mild and the cross-section of the filter comes to be apt to close to circle with the increase of winding up of the web on a winding core, but no adverse effects to filter performances are produced.

As the melt-adhesive composite fibers used in the filters of the present invention, composite fibers are used which are produced by selecting two kinds of resins, having a difference in melting point preferably of 10° C. or more, from the group of fiber forming thermoplastic resins such as polyolefins, polyesters, and polyamides, and composite spinning both resins in a side by side fashion, or in a sheath core fashion in which a low melting point resin is arranged as sheath component. In the case of sheath core, it may be an eccentric structure. Fiber cross-section can be circular, oval, or non-circular of various shapes. An important aspect of the structure of composite fibers is that a low melting point component occupies at least a part of circumference of cross-section of composite fibers. The ratio in fiber cross-section occupied by a low melting point component is not particularly restricted and it may be changed along the axial direction of fiber. In short, it is sufficient that the composite fibers have such a structure that the low melting point component causes melt-adhesion by heat treatment at each of the contact points of the fibers.

As the combination of the components in melt-adhesive composite fibers, combination of polyethylene/polypropylene, polypropylene/polyester, or nylon 6/nylon 66 can be mentioned as examples of a low melting point component and high melting point component. When the difference in melting point of the combined resins is less than 10° C., control of production step unpreferably becomes difficult since the temperature range permitted in heating operation when a web is wound up becomes narrow.

As the layer of a fibrous aggregate used in the present invention, a mixture of melt-adhesive composite fibers with natural fibers, other kinds of synthetic fibers, or others may be used provided that the melting point of the composite fibers at melt-adhesion is not changed, in addition to fibrous aggregates consisting only of the composite fibers. In order not to lose the strength of a filter as a whole, mixing ratio of other fibers is preferably 50% or less.

In order that the filters of the present invention having the structure as mentioned above develop stable filtration performances, end surfaces of the filters are preferably sealed. That is, since a layer of a non-woven fabric of glass fibers is formed as a medium layer in the filter, there is a risk depending on the method for setting a filter housing that the leak (short pass phenomenon) of fine particles contained in a liquid to be filtered (original liquid) from the region of an outer layer is caused at the end surfaces of a filter. Therefore, the end surfaces of filters are preferably sealed in advance. As the method for sealing the end surfaces of filters, such known methods can be used as a method in which a foam material or rubber gasket is adhered with an adhesive agent, and a method in which an end cap made of the same kind of material as the fibers which form the filter is bonded to the end surfaces with heat or an adhesive agent.

Cylindrical filters of the present invention include a layer of a non-woven fabric of glass fibers having a smaller diameter than that of melt-adhesive composite fibers which form a component of the filters, and the layer of a non-woven fabric of glass fibers is arranged in a specific position in the filters. Accordingly, filter rating can be increased and filter life of the filters can be considerably prolonged by controlling the porosity and thickness of the non-woven fabric of glass fibers.

Now, the present invention will be described in more detail with reference to Examples. However, it should be understood that the present invention is by no means restricted by such specific Examples.

Tests for filtration performances determined in each of Examples are carried out by the following methods:

Filter Rating:

One sample filter (250 mm) is fixed to a housing of a circulation type apparatus for testing filtration performances and water is circulated from 50 l of water tank. Flow rate is adjusted to 30 l/min; then AC fine test dust/ACFTD (middle value of diameter: 6.6 to 8.6 μm) which is a standard powder for testing fundamental physical properties is continuously added as testing powder in the water tank in an amount of 60 mg/min; an original liquid and filtrate are collected 5 minutes after the start of the addition, and the particle size distribution of the particles contained in each of the liquids is determined by using a light cutoff type particle detector. By using the results of the determination of particle size distribution, the ratio of the number of particles captured by the sample filter is calculated as capturing efficiency and the particle size of the particles 99.9% of which are captured is regarded as filter rating.

Filter life:

One sample filter (250 mm) is fixed to a housing of a circulation type apparatus for testing filtration performances and water is circulated at a flow rate of 30 l/min. To this water is continuously added ACFTD in an amount of 400 mg/min, the pressure in the sample filter at a point of the primary side and the secondary side is determined, and the change in pressure drops is recorded. The period of time until the pressure drops reaches 2 kg/cm$^2$ is regarded as filter life.

EXAMPLES 1 through 6

Fibrous aggregate comprising melt-adhesive composite fibers (size: 3 denier, diameter: corresponding to 22 μm, cut length: 64 mm) having a sheath core cross-section and comprising polyethylene and polypropylene was wound up by the method in which a web is wound up while being heated to melt on a metal core (Japanese Patent Publication No. Sho 64-43139). From the position of between 7 and 18 mm in thickness, a layer of a non-woven fabric of glass fibers was formed in a thickness of 2 mm or more as shown in Table 1, and then a web comprising melt-adhesive composite fibers was continuously wound up outside the layer of the non-woven fabric of glass fibers while heating to melt to form a cartridge filter having an outside diameter of 70 mm, inside diameter of 30 mm, and a length of 240 mm. Both end portions of the filter were sealed with a polyethylene foam (foaming factor: three-fold, thickness: 3 mm) cut in a doughnut shape to make the entire length to 250 mm. Hot melt adhesive agent was used to bond the foam with the filter. Filtration performances of the filter thus obtained are shown in Table 1.

COMPARATIVE EXAMPLE 1

A cylindrical filter having the same dimensions as those of the cylindrical filter in Example 1 mentioned above was prepared by the same method as in Example 1 except that a non-woven fabric of glass fibers was wound up from the position of 18 mm from the inner surface of the filter (position at 9/10 of thickness from the inner surface) to the position of 20 mm. After the winding up of glass fibers, end portions of the non-woven fabric were fixed by using a hot-melt adhesive agent, and then further fixed at 8 points in a ring shape with a polypropylene monofilament of 250 d/f. Subsequently, both end portions of the filter were sealed in a doughnut shape with a polyethylene foam in the same manner as in Example 1. Results of determination of filtration performances of the filter are shown in Table 1.

COMPARATIVE EXAMPLES 2 through 4

Cartridge filters having an outside diameter of 70 mm, inside diameter of 30 mm, and a length of 240 mm were prepared and their end surfaces were sealed in a doughnut shape by the same method as in Example 1 except in that a non-woven fabric of polypropylene fibers produced by a melt-blow process was used in place of a non-woven fabric of glass fibers as a medium layer. Filtration performances of the filters are shown in Table 1.

TABLE 1

| | Non-woven fabric as a medium layer | | | | | |
|---|---|---|---|---|---|---|
| | Position (mm)[1] | Fiber diameter (μm) | Thickness (mm) | Porosity (%) | Filter rating (μm) | Filter life (min) |
| Example 1 | 7 | 1.0 | 10 | 96.0 | 0.9 | 20 |
| Example 2 | 13.5 | 1.0 | 2 | 96.0 | 1.0 | 32 |
| Comparative Example 1 | 18 | 1.0 | 2 | 96.0 | 1.0 | 8 |
| Example 3 | 10 | 1.5 | 2 | 98.5 | 1.8 | 55 |
| Comparative Example 2 | 10 | 1.5 | 2 | 92.3 | 2.5 | 17 |
| Example 4 | 10 | 1.5 | 5 | 98.5 | 1.7 | 65 |
| Comparative Example 3 | 10 | 1.5 | 5 | 92.3 | 2.0 | 15 |
| Example 5 | 10 | 3.0 | 5 | 98.5 | 3.2 | 99 |
| Comparative Example 4 | 10 | 3.0 | 5 | 92.3 | 4.2 | 30 |
| Example 6 | 10 | 0.5 | 5 | 99.0 | 0.7 | 35 |

[1]: Distance from inside surface of filter

We claim:

1. A cylindrical filter comprising a wound up innermost layer, an outermost layer, each of said layers comprising a fibrous aggregate of melt-adhesive composite fibers bonded to each other through the melt of a melt-adhesive component in said composite fibers, and a layer of a non-woven fabric of glass fibers, said layer of the non-woven fabric of glass fibers being arranged between said innermost layer and said outermost layer and circumferentially wound up at a position of 1/5 to 4/5 in a thickness direction from an inner surface of said cylindrical filter, having a porosity of 96% or greater, and occupying 10 to 50% of the thickness of said cylindrical filter, and said glass fibers having a smaller diameter than that of said melt-adhesive composite fibers.

2. The cylindrical filter according to claim 1 wherein said composite fibers are composed of a low melting point component and a high melting point component, and said components have a difference in their melting point of 10° C. or more.

3. The cylindrical filter according to claim 1 wherein said glass fibers have a diameter of 3 μm or smaller.

4. The cylindrical filter according to claim 1 wherein said layer of the non-woven fabric of glass fibers is circumferentially wound up at a position of 1/2 to 4/5 in the thickness direction from the inner surface of said cylindrical filter.

5. A cylindrical filter comprising:
   an innermost layer including a fibrous aggregate of melt-adhesive composite fibers;
   a layer of non-woven fabric of glass fibers wound around the innermost layer, said glass fibers having a diameter of approximately 3 μm or smaller, and said layer of non-woven fabric having a porosity of 96% or greater; and an outermost layer including a fibrous aggregate of melt-adhesive composite fibers wound around the layer of non-woven fabric.

6. The cylindrical filter according to claim 5 wherein said layer of a non-woven fabric of glass fibers is circumferentially arranged at a position of ½ to ⅘ in thickness direction from inner surface of said cylindrical filter.

7. The cylindrical filter according to claim 5 wherein said composite fibers are composed of a low melting point component and a high melting point component, and said components have a difference in their melting point of 10° C. or more.

* * * * *